United States Patent
Ogawa et al.

(10) Patent No.: US 8,092,902 B2
(45) Date of Patent: Jan. 10, 2012

(54) HARD COAT FILM AND DISPLAY USING THE SAME

(75) Inventors: Naomi Ogawa, Tokyo (JP); Masaaki Yanaka, Tokyo (JP)

(73) Assignee: Toppan Printing Co., Ltd. (JP)

( * ) Notice: Subject to any disclaimer, the term of this patent is extended or adjusted under 35 U.S.C. 154(b) by 1040 days.

(21) Appl. No.: 11/999,869

(22) Filed: Dec. 7, 2007

(65) Prior Publication Data

US 2009/0148696 A1    Jun. 11, 2009

(51) Int. Cl.
*B32B 27/32* (2006.01)
*B32B 17/10* (2006.01)
*B32B 27/40* (2006.01)
*B32B 9/00* (2006.01)

(52) U.S. Cl. ..... 428/220; 428/332; 428/339; 428/423.1; 428/689

(58) Field of Classification Search ......... None
See application file for complete search history.

(56) References Cited

U.S. PATENT DOCUMENTS

2008/0020201 A1*    1/2008    Winckler et al. ............. 428/336

FOREIGN PATENT DOCUMENTS

JP    2001-287308    10/2001

* cited by examiner

*Primary Examiner* — Sheeba Ahmed

(74) *Attorney, Agent, or Firm* — Squire, Sanders & Dempsey (US) LLP

(57) ABSTRACT

One embodiment of the present invention is a hard coat film having a hard coat layer and a function layer on a substrate film, wherein the hard coat layer is formed by irradiating an acrylic acid derivative with ionizing radiation, and wherein (a) a carboxylic acid group (C=O) absorption intensity of a surface of the hard coat layer and (b) a carbon double bond (C=C) absorption intensity of the hard coat layer surface satisfy a numerical value range represented expressed by the following Expression 1, the absorption intensities being measured by infrared ray spectroscopy: $0.15 \leq (b)/(a) \leq 0.30$ . . . Expression 1.

9 Claims, 2 Drawing Sheets

HARD COAT FILM AND DISPLAY USING THE SAME

BACKGROUND OF THE INVENTION

1. Field of the Invention

This invention relates to a hard coat film to be provided on a surface of a window, a display, and the like. Particularly, this invention relates to the hard coat film to be provided on a surface of a display such as a liquid crystal display (LCD), a CRT display, an organic electroluminescence display (ELD), a plasma display (PDP), a surface-conduction electron-emitter display (SED), and a field emission display (FED).

2. Description of the Related Art

A hard coat layer as a protection film is often provided on a surface of an optical component member of a display medium such as a liquid crystal display. Further, a function layer is often provided on the hard coat layer. Examples of the function layer to be provided on the hard coat layer include an anti-reflection layer for preventing reflection of light and the like.

In the case of providing the function layer on the hard coat layer, when adhesion between the hard coat layer and the function layer (hereinafter, adhesion means the adhesion between a hard coat layer and a function layer) is insufficient, scratches are easily caused on the hard coat layer or the function layer due to peeling caused by an impact applied on a surface of the function layer. Also, as a result of a weather resistance test, it has been found that the function layer or the hard coat layer is not only deteriorated by ultraviolet ray irradiation but also bonding at a boundary is weakened to further diminish the adhesion. Accordingly, scratches are more easily caused on the hard coat layer or the function layer, and there is a fear that the function layer is peeled off to make the product unusable.

Therefore, studies on improvement in adhesion have been conducted, and, for example, Patent Document 1 (JP-A-2001-287308) discloses that excellent adhesion to a function coating is achieved when a hard coat layer has a surface hardness (pencil hardness) of 2H or more, a surface shaving index of 1.0 to 15.0, and a centerline average surface roughness (Ra) on a surface of the hard coat coating of 0.001 to 0.02 μm.

For example, it is described in Patent Document 1 (JP-A-2001-287308) that a value of the surface shaving index is a parameter indicating a precipitation of a filler contained in the hard coat coating, and that a shaved white powder adheres to the film surface to transfer to the function layer laminated on the hard coat layer, etc. when the surface shaving index largely deviates from the above-specified range, thereby causing a reduction in adhesion. Also, it is described that, when the average surface roughness (Ra) exceeds the above-specified upper limit, the adhesion is undesirably diminished in the case where the function coating is laminated.

However, the degree of precipitation of filler is not the sole parameter that influences on the adhesion between the hard coat layer and the function layer. Also, according to findings of the inventors of this invention, excellent adhesion has been achieved when the centerline average surface roughness of the above-mentioned hard coat layer surface is out of the range specified in Patent Document 1. Accordingly, it is difficult to allege that there is correlativity between the adhesion and the hard coat coating centerline average surface roughness, and it is not appropriate to specify the hard coat coating centerline average surface roughness for the purpose of obtaining a hard coat coating increased in adhesion. Also, since accuracy of the method of measuring the surface shaving index is insufficient, the surface shaving index is not appropriate as the parameter for evaluating characteristics of hard coat coating.

Patent Document 1: JP-A-2001-287308

SUMMARY OF THE INVENTION

This invention provides a hard coat film that includes a hard coat layer with excellent adhesion to a function layer. According to one embodiment of this invention, there is provided a hard coat film comprising a hard coat layer and a function layer on a substrate film, wherein the hard coat layer is formed by curing by irradiating an acrylic acid derivative with ionizing radiation, and (a) a carboxylic acid group (C=O) absorption intensity of a surface of the hard coat layer and (b) a carbon double bond (C—C) absorption intensity of the hard coat layer surface satisfy a numerical value range represented by the following Expression 1, the absorption intensities being measured by infrared ray spectroscopy:

$$0.15 \leq (b)/(a) \leq 0.30 \qquad \text{Expression 1.}$$

DESCRIPTION OF REFERENCE NUMERALS AND SIGNS

Figure 1:
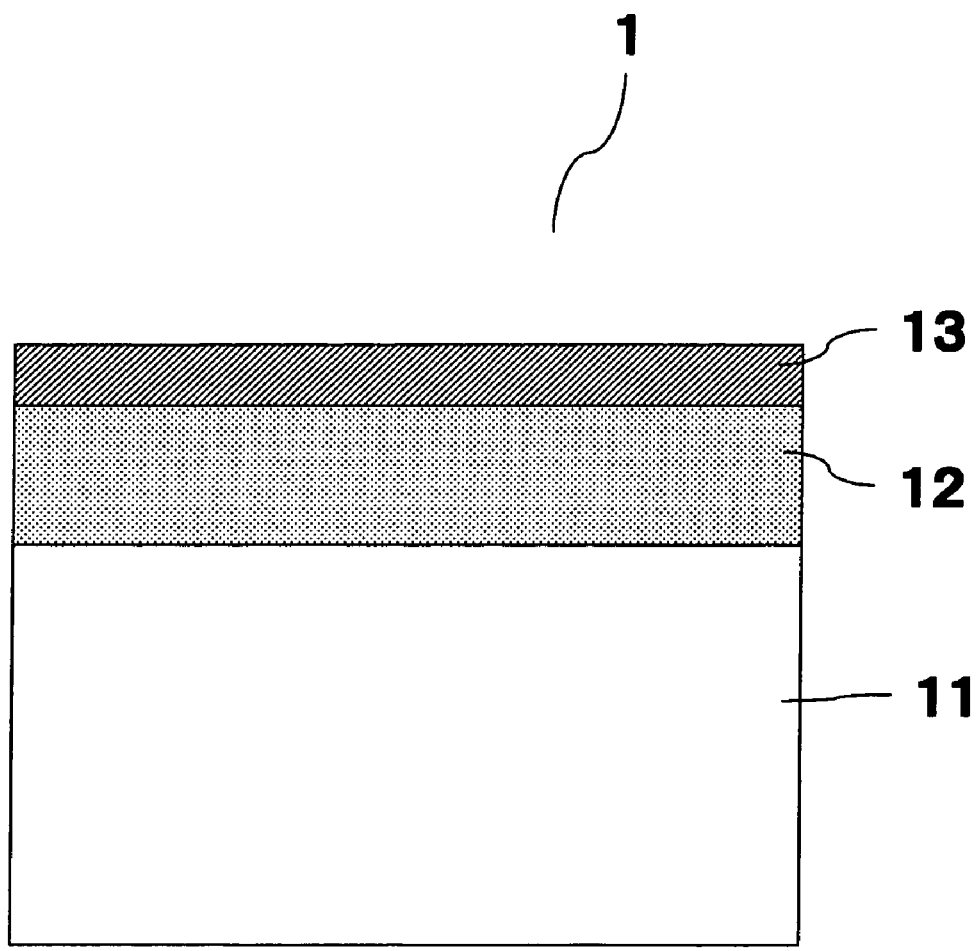
FIG. 1 is a schematic sectional view showing a hard coat film of an embodiment of this invention.

1: hard coat film
11: substrate film
12: hard coat layer
13: function layer
2: polarization plate
21: substrate film
22: substrate film
23: polarization layer
3: liquid crystal cell
4: polarization plate
41: substrate film
42: substrate film
43: polarization layer
5: back light unit

DESCRIPTION OF THE PREFERRED EMBODIMENTS

Shown in FIG. 1 is a schematic sectional view of the hard coat film of an embodiment of this invention.

The hard coat film (1) of this invention includes a hard coat layer (12) and a function layer (13) that are provided on a substrate film (11) in this order.

In some embodiments of this invention, the hard coat layer is formed by curing by irradiating an acrylic acid derivative with ionizing radiation, and an absorption intensity ratio ((b)/(a)) obtained by dividing (b) a carbon double bond (C—C) absorption intensity of the hard coat layer surface, which is measured by infrared ray spectroscopy, by (a) a carboxylic acid group (C=O) absorption intensity of the hard coat layer surface, which is measured by infrared ray spectroscopy, is 0.15 or more and 0.30 or less.

The inventors of this invention have studied hard coat layer characteristics relating to adhesion to find that there is correlativity between a degree of surface curing and the adhesion and have conducted a research on the correlativity to invent the hard coat film of this invention.

The hard coat layer of this invention contains the acrylic acid derivative. The acrylic acid derivative is cured by polymerization reaction caused by irradiation with ionizing radiation. The curing is promoted by conversion of the carbon double bond (C=C) into a single bond, but the carboxylic acid group (C=O) does not change during the polymerization. Accordingly, by employing an ATR method using a Fourier conversion infrared spectroscopic analysis device (FT-IR), an absorption intensity ratio of the absorption intensity of the carbon double bond (C=C) to the absorption intensity of the carboxylic acid group (C=O) was measured. The absorption intensity ratio is used as an index parameter since a smaller value of the absorption intensity ratio means that the polymerization and curing of the acrylic acid derivative has been promoted. Therefore, in the hard coat layer containing the acrylic acid derivative, it is possible to evaluate a degree of curing by the absorption intensity ratio of the absorption intensity of the carbon double bond (C=C) to the absorption intensity of the carboxylic acid group (C=O).

In the case where the curing of the hard coat layer surface is insufficient, the hard coat layer itself can be damaged due to weak bonding of the hard coat layer, thereby reducing the adhesion. Also, in the case where the curing of the surface is excessive, the adhesion to the function layer is reduced due to an increase in internal stress on the hard coat layer surface.

The absorption intensity ratio that is obtained as described above is a characteristic value that indicates a degree of curing of a hard coat layer surface and different from a pencil hardness that indicates a hardness of an overall hard coat layer. This value has a close relationship with the adhesion to the function layer in the case where the function layer is formed on the hard coat layer. Therefore, it is possible to provide the hard coat layer excellent in adhesion to the function coating by specifying the absorption intensity ratio.

In the hard coat film of this invention, the hard coat layer is optimally cured and excellent in adhesion to the functional layer. Since the adhesion between the hard coat layer and the function layer before weather resistance test is good in the hard coat film of this invention, the adhesion between the hard coat layer and the function layer is not diminished particularly after the weather resistance test.

More specifically, in the hard coat film, the absorption intensity ratio ((b)/(a)) obtained by dividing (b) the carbon double bond (C=C) absorption intensity of the hard coat layer surface, which is measured by infrared ray spectroscopy, by (a) the carboxylic acid group (C=O) absorption intensity of the hard coat layer surface, which is measured by infrared ray spectroscopy, can be in the range of from 0.15 or more to 0.30 or less. Insofar as the absorption intensity ratio is within the above-specified range, it is possible to increase the adhesion between the hard coat layer and the function layer when providing the function layer on the hard coat layer. When the absorption intensity ratio exceeds 0.30, the hard coat layer itself can be damaged due to weak bonding of the hard coat coating, and the adhesion is diminished. Also, when the absorption intensity ratio is less than 0.15, the adhesion to the function layer is diminished due to an increase in internal stress on the hard coat layer by the shrink of curing.

The method of measuring the surface of the hard coat layer of this invention by employing the infrared spectroscopy will be described below. In the measurement of infrared absorption intensity of the hard coat layer surface by employing the infrared spectroscopy, it is possible to use a Fourier conversion type infrared spectroscopic analysis device (FT-IR). The Fourier conversion type infrared spectroscopic analysis device (FT-IR) detects an infrared absorption spectrum by: modulating infrared light with an interferometer; collecting the infrared light into a narrow beam by using a concave lens to make the infrared light incident to a sample; collecting the infrared light transmitted through or reflected by the sample by using a concave lens to guide the infrared light to a detector; and processing a detection signal by using a computer.

In order to measure the infrared absorption intensity of the surface of the hard coat layer, it is possible to employ the ATR method using the infrared spectroscopic analysis device (FT-IR). As an ATR prism for the ATR method, KRS-5 is used. Since it is possible to obtain a large spectrum intensity by using KRS-5 as the ATR prism, it is possible to measure the infrared ray absorption intensity with high reproducibility. In the case where the ATR prism is KRS-5, a depth of penetration of the measurement light into the hard coat layer is about 1 μm, and it is possible to consider the absorption intensity to such depth is measured.

In the case of measuring the infrared absorption intensity of the hard coat layer surface by employing the ATR method, the hard coat film is cut into the size of the ATR prism, and the cut hard coat layer is brought into contact with the ATR prism. In this case, since the hard coat film is usually curled with the hard coat layer surface being medially-located, it is difficult to bring the hard coat layer into uniform contact with the prism. Therefore, it is preferable to conduct the measurement in a state where the hard coat layer is brought into uniform contact with the prism by uniformly pressing the hard coat film contacting the prism with the use of a silicon rubber sheet or the like.

In the hard coat film of this invention, the function layer to be provided adjacent to the hard coat layer may preferably contain a metal oxide. When the function layer contains a metal oxide, it is possible to further improve the adhesion between the hard coat layer and the function layer in the hard coat film of this invention.

A thickness of the hard coat layer of this invention may preferably be 3 μm or more to 15 μm or less. In the case where the thickness of the hard coat layer is less than 3 μm, a satisfactory surface hardness of the hard coat layer is not achieved in some cases. When the thickness of the hard coat layer exceeds 15 μm, a degree of curling of the hard coat film on which the hard coat layer is formed is increased too much. When the degree of curling is too large, it is difficult to attach the hard coat film to another member.

As the function layer to be provided on the hard coat layer, those having an anti-reflection property, an antistatic property, an anti-fouling property, an electromagnetic wave-shielding property, an infrared ray absorption property, an ultraviolet ray absorption property, a color correction property, and the like may be used. Examples of such function layers include an anti-reflection layer, an antistatic layer, an anti-fouling layer, an electromagnetic wave-shielding layer, an infrared ray absorption layer, an ultraviolet ray absorption layer, a color correction layer, and the like. The function layer may be a single layer or may have a lamination structure formed of a plurality of layers. The single function layer may have a plurality of functions such as an anti-reflection layer having anti-fouling property.

A thickness of the function layer may preferably be 0.01 μm or more and 1 μm or less. In the case where the function layer has the lamination structure, a thickness of the overall function layer may preferably be 0.01 μm or more and 1 μm or less. The hard coat film of this invention exhibits a prominent effect when the thickness of the function layer to be formed is 0.01 μm or more and 1 μm or less.

Also, the function layer may be provided between the substrate film and the hard coat layer in addition to the function layer provided on the hard coat layer when so required.

The hard coat film of this invention is to be provided on a surface of a display such as a liquid crystal display (LCD), a CRT display, an organic electroluminescence display (ELD), a plasma display (PDP), a surface-conduction electron-emitter display (SED), and a field emission display (FED) for the purpose of protecting the display surface.

Figure 2:
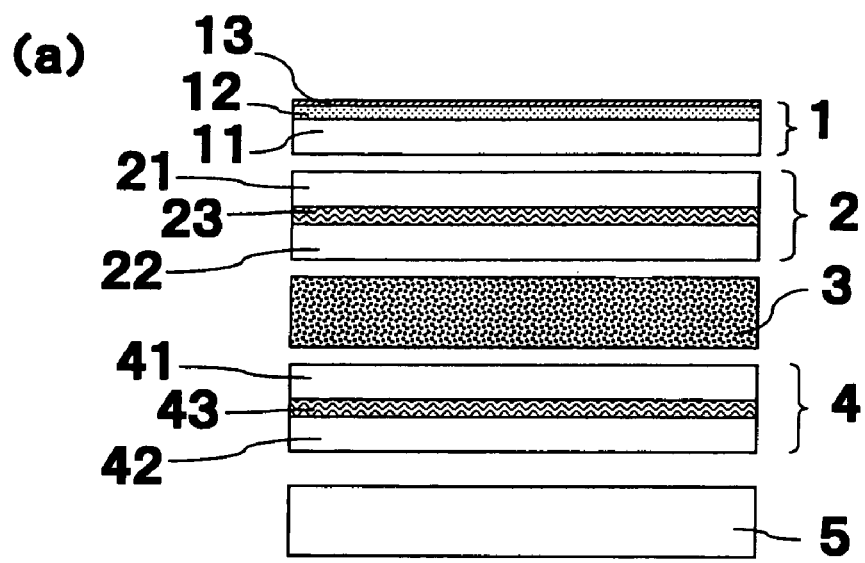
FIGS. 2A and 2B are schematic sectional views each showing a transmissive liquid crystal display including a hard coat film on the surface of the display.
Figure 2:
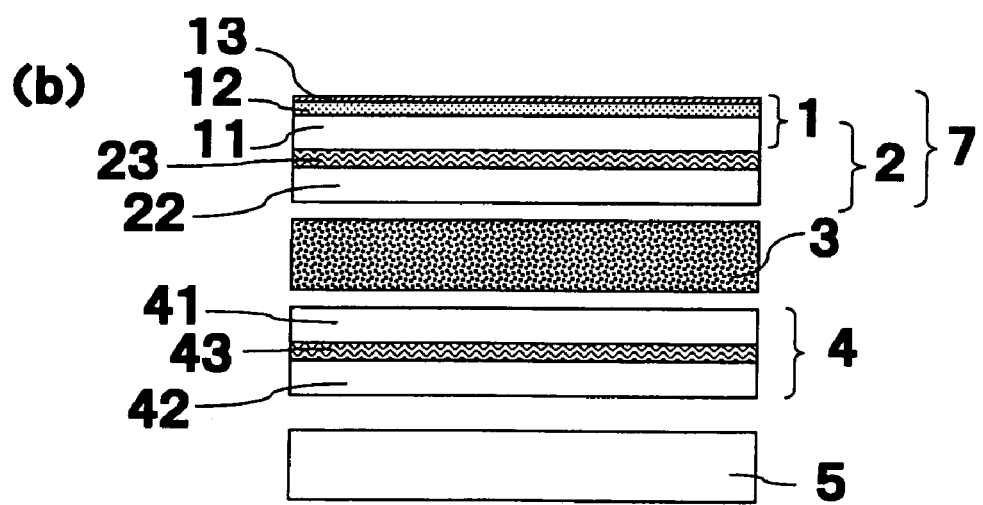

FIG. 2A and 2B are schematic sectional views each showing a transmissive liquid crystal display having a hard coat film of an embodiment of this invention on its surface. A transmissive liquid crystal display of FIG. 2A is provided with a backlight unit (5), a polarization plate (4), a liquid crystal cell (3), a polarization plate (2), and a hard coat film (1) in this order. The side of the hard coat film (1) is the side to be viewed, i.e. the display surface.

The backlight unit (5) is provided with a light source and a light diffusion plate. The liquid crystal cell has such a structure that: an electrode is provided on one of transparent substrates; an electrode and a color filter are provided on the other transparent substrate; and a liquid crystal is enclosed between the electrodes. Each of the polarization plates sandwiching the liquid crystal cell (3) has such a structure that a polarization layer (23 or 43) are sandwiched between the substrate films (21, 22, or 41, 42).

Shown in FIG. 2A is the transmissive liquid crystal display wherein the substrate film (11) of the hard coat film (1) and the substrate film (21) of the polarization plate (2) are provided separately. In turn, shown in FIG. 2B is a structure wherein the polarization layer (23) is provided on a surface opposite to the hard coat layer of the substrate film (11) of the hard coat film (1), and the substrate film (11) is used as a substrate film for the transparent substrate of the hard coat film (1) and a substrate film for the polarization plate (2).

The transmissive liquid crystal display of this invention may be provided with another functional member. Examples of the functional members include, but not limited to, a diffusion film, a prism sheet, and a brightness improvement film that are used for effectively utilizing the light emitted from the backlight; a phase difference film that is used for compensating for a phase difference of the liquid crystal cell and the polarization plate; and the like.

A production process for the hard coat film of this invention will be described below.

The hard coat film of some embodiments of this invention can be formed by forming a coating film on a substrate film by applying a hard coat layer-forming coating liquid containing an acrylic acid derivative and then curing the coating film by irradiating the coating film with an ionizing radiation such as an ultraviolet ray and an electron ray. The hard coat layer-forming coating liquid may contain a photopolymerization initiator, a solvent, and the like as required.

Examples of the substrate film to be used for the hard coat film of this invention include films of polyethylene telephthalate (PET), polyethylene naphthalate (PEN), polyamide (PA), polycarbonate (PC), polyacryl (PMMA), nylon (Ny), polyethersulfone (PES), polyvinyl chloride (PVC), polypropylene (PP), triacetylcellulose (TAC), polyvinylalcohol (PVA), ethylenevinylalcohol, and the like. A thickness of the substrate film may preferably be in the range of from 10 µm or more to 500 µm or less, more preferably the range of from 25 µm or more to 200 µm or less.

In the hard coat film using the substrate film, since the substrate film has flexibility, the function layer provided on the hard coat layer can be easily peeled off due to deformation of the substrate film. Accordingly, there is a demand for strong adhesion between the hard coat layer and the function layer. Therefore, the hard coat film of this invention wherein the adhesion between the function layer and the hard coat layer is excellent is remarkably useful.

Examples of the acrylic acid derivative to be used in this invention include those having 3 or more, preferably 4 to 20 (meth)acryloyl groups, such as acrylic acid esters, acrylamides, methacrylic acid esters, and amide methacrylates. The acrylic acid derivative may be a monomer or an oligomer. Examples of the acrylic acid derivative include trimethylolpropanetri(meth)acrylate, pentaerythritoltri(meth)acrylate, pentaerythritoltetra(meth)acrylate, dipentaerythritolhexa(meth)acrylate, and the like.

Among the acrylic acid derivatives, polyfunctional urethane acrylate may preferably be used since it is possible to design a desired molecular weight and a desired molecular structure as well as to easily balance physical properties of the hard coat layer to be formed. Urethane acrylate is obtainable by reacting a polyvalent alcohol, polyvalent isocyanate, and hydroxyl group-containing acrylate, and, in the case of forming the hard coat layer by using the urethane acrylate alone and without using any polymer compound, it is preferable to use urethane acrylate that achieves a pencil hardness of the hard coat layer surface of 4H. Specific examples of urethane acrylate include, but not limited to, UA-306H, UA-306T, UA-306I, and the like that are manufactured by Kyoeisha Chemical Co., Ltd.; UV-1700B, UV-6300B, UV-7600B, UV-7605B, UV-7640B, UV-7650B, and the like that are manufactured by Nippon Synthetic Chemical Co., Ltd; U-4HA, U-6HA, UA-100H, U-6LPA, U-15HA, UA-32P, U-324A, and the like that are manufactured by Shin-Nakamura Chemical Co., Ltd.; Ebecryl-1290, Ebecryl-1290K, Ebecryl-5129, and the like that are manufactured by Daicel-Cytec Company, Ltd.; UN-3220HA, UN-3220HB, UN-3220HC, UN-3220HS, and the like that are manufactured by Negami Chemical Industries Co., Ltd.; and the like.

In the case of curing the hard coat layer-forming coating liquid with the ultraviolet ray, a photopolymerization initiator is added to the hard coat layer-forming coating liquid. The photopolymerization initiator is not particularly limited insofar as it generates radicals when irradiated with the ultraviolet ray, and examples thereof include 1-hydroxycyclohexylphenylketone, 2-hydroxy-2-methyl-1-phenylpropane-1-one, 2-methyl[4-(methylthio)phenyl]-2-morpholinopropane-1-one, 2,2-dimethoxy-1,2-diphenylethane-1-one, benzophenone, 1-[4-(2-hydroxyethoxy)phenyl]-2-hydroxy-2-methyl-1-propane-1-one, 2-benzyl-2-dimethylamino-1-(4-morpholinophenyl)butane-1-one, bis(2,6-dimethoxybenzoyl)-2,4,4-trimethylpentylphosphineoxide, and the like. An amount of the photopolymerization initiator to be added with respect to 10 to 80 parts by mass of the acrylic acid derivative may be 0.1 to 10 parts by mass, preferably 1 to 7 parts by mass, more preferably 1 to 5 parts by mass.

Further, a solvent and various additives may be added to the hard coat layer-forming coating liquid as required. The solvent may be appropriately selected in view of coating processing suitability and the like from aromatic hydrocarbons such as toluene, xylene, cyclohexane, cyclohexylbenzene; hydrocarbons such as n-hexane; ethers such as dibutylether, dimethoxymethane, dimethoxyethane, diethoxyethane, propyleneoxide, dioxane, dioxolan, trioxane, tetrahydrofuran, anisole, and phenetole; ketones such as methylisobutylketone, methylbutylketone, acetone, methylethylketone, diethylketone, dipropylketone, diisobutylketone, cyclopentanone, cyclohexanone, 2-methylcyclohexanone, and 4-methylcyclohexanone; esters such as ethyl formate, propyl formate, n-pentyl formate, methyl acetate, ethyl acetate, methyl propionate, ethyl propionate, n-pentyl acetate, and γ-butyrolactone; cellosolves such as methylcellosolve, cellosolve, butylcellosolve, and cellosolve acetate; alcohols such as methanol, ethanol, and isopropyl alcohol; water; and the like. As the additives, a surface adjuster, an antistatic agent, an anti-foulant, a water repellant, a refractive index adjuster, an adhesion improver, a curing agent, and the like may be added.

Particles may be added to the hard coat layer-forming coating liquid in this invention. In the case of adding particles, it is possible to form unevenness on the hard coat layer surface. The hard coat film having the surface unevenness is capable of scattering light that is made incident to the hard coat film surface and has an anti-glare property.

The hard coat layer-forming coating liquid is applied on the substrate film to form a coating film. As a coating method of the hard coat layer-forming coating liquid, a coating method using a roll coater, a reverse roll coater, a gravure coater, a micro-gravure coater, a knife coater, a bar coater, a die coater, or a dip coater may be employed.

In the case where the solvent is contained in the hard coat layer forming-coating liquid, it is necessary to remove the solvent from the coating film formed on the substrate film by drying. As a drying means, heating, air blasting, heated air, or the like may be used.

The hard coat layer can be formed by ionizing radiation irradiation of the coating film that is formed on the substrate film on which the drying process has been performed when so required. As the ionizing radiation, an ultraviolet ray or an electron ray may be used. In the case of the ultraviolet ray curing, a light source such as a high pressure mercury lamp, a low pressure mercury lamp, an ultrahigh pressure mercury lamp, a metal halide lamp, a carbon arc, a xenon arc, and the like may be used. In the case of the electron ray curing, an electron ray emitted from various electron ray accelerators such as a Cockroft-Walton accelerator, a Van de Graaff accelerator, a resonance transformer accelerator, an insulated core transformer accelerator, a linear accelerator, a dynamitoron accelerator, and a high frequency accelerator may be used. The electron ray may preferably have energy of 50 to 1,000 KeV. The electron ray may more preferably have energy of 100 to 300 Kev.

A method for forming the anti-reflection layer to be provided as the functional layer on the hard coat layer will be described below. Examples of the anti-reflection layer to be provided as the functional layer on the hard coat layer include an anti-reflection layer having a structure wherein a high refractive index layer and a low refractive index layer are laminated alternately and an anti-reflection layer having a single layer structure formed of a single low refractive index layer. The method for forming the anti-reflection layer can be classified into a method employing a vacuum film formation method such as vacuum vapor deposition, sputtering, and CVD and a method employing a wet film formation method of forming the anti-reflection layer by applying an anti-reflection layer-forming coating liquid on a hard coat layer surface.

In the case of employing the vacuum film formation method for forming the anti-reflection layer wherein the low refractive index layer and the high reflective index layer are alternately laminated, a two-layer structure formed of a high refractive index layer and a low refractive index layer that are laminated in this order from the hard coat layer side or a four-layer structure formed of a high refractive index layer, a low refractive index layer, a high refractive index layer, and a low refractive index layer that are laminated in this order from the hard coat layer side may be selected.

Examples of a material for forming the high refractive index layer include metals such as indium, tin, titanium, silicon, zinc, zirconium, niobium, magnesium, bismuth, cerium, tantalum, aluminum, germanium, potassium, antimony, neodymium, lanthanum, thorium, and hafnium; alloys comprising two or more of the metals; oxides, fluorides, sulfides, and nitrides of the metals; and the like. More specifically, a metal oxide such as titanium oxide, niobium oxide, zirconium oxide, tantalum oxide, zinc oxide, indium oxide, cerium oxide, and indium tin oxide may be used. In the case of laminating the plural high reflective index layers, it is not always necessary to use an identical material for the layers, and it is possible to select the materials in accordance with the purpose.

Examples of a material for forming the low refractive index layer include, but not limited to, silicon oxide, titanium nitride, magnesium fluoride, barium fluoride, calcium fluoride, hafnium fluoride lanthanum fluoride, and the like. In the case of laminating the plural low reflective index layers, it is not always necessary to use an identical material for the layers, and it is possible to select the materials in accordance with the purpose. Particularly, in view of optical characteristics, mechanical strength, cost, film formation properties, and the like, silicon oxide which is a metal oxide is the most suitable material.

It is possible to form the anti-reflection layer by forming a film of the high refractive index layer material and a film of the low refractive index layer material one by one by the vacuum film formation method. As the vacuum film formation method, vapor deposition, ion plating, ion beam assist, sputtering, or CVD may be employed. In the anti-reflection layer, a medium refractive index layer may be provided between the high refractive index layer and the low refractive index layer.

A method for forming, as the anti-reflection layer, the low refractive index single layer by the wet film formation method by applying the low refractive index layer-forming coating liquid on the hard coat layer surface will be described below. A film thickness (d) of the low refractive index single layer serving as the anti-reflection layer is so designed as to keep an optical film thickness (nd) which is obtained by multiplying the film thickness (d) by a refractive index (n) of the low refractive index layer to a value that is ¼ of a wavelength of visible light. As the low refractive index layer, a layer in which low refractive particles are dispersed in a binder matrix may be used.

Examples of the low refractive index particles include those formed from a low refractive index material such as magnesium fluoride, calcium fluoride, and porous silicon oxide. As a metal oxide, silicon oxide may preferably be used among others. As a material for forming the binder matrix, an ionizing radiation material such as acrylic acid of a polyvalent alcohol; polyfunctional acrylate such as ester methacrylate; or polyfunctional urethane acrylate which can be synthesized from diisocyanate, a polyvalent alcohol, hydroxy ester of acrylic acid or methacrylic acid; and the like may be used. In addition to the above examples, ionizing radiation materials such as an polyether resin, a polyester resin, an epoxy resin, an alkyd resin, a spiroacetal resin, a polybutadiene resin, and a polythiolpolyene resin each having an acrylate functional group are usable. In the case of using the ionization radiation-curable materials described above, the binder matrix is formed by irradiation with ionizing radiation such as an ultraviolet ray and an electron ray. Also, as the binder matrix-forming material, metal alkoxide of silicon alkoxide and the like such as tetramethoxysilane and tetraethoxysilane may be used. A binder matrix based on the silicon oxide which is a metal oxide is obtainable from the metal alkoxide through hydrolysis and dehydration condensation.

The low refractive index layer-forming coating liquid containing the low refractive index material and the binder matrix-forming material is applied on the hard coat layer surface. A solvent and various additives may be added to the low refractive index layer-forming coating liquid when so required. The solvent may be appropriately selected in view of coating processing suitability and the like from aromatic hydrocarbons such as toluene, xylene, cyclohexane, cyclohexylbenzene; hydrocarbons such as n-hexane; ethers such as dibutylether, dimethoxymethane, dimethoxyethane, diethoxyethane, propyleneoxide, dioxane, dioxolan, trioxane, tetrahydrofuran, anisole, and phenetole; ketones such as methylisobutylketone, methylbutylketone, acetone, methylethylketone, diethylketone, dipropylketone, diisobutylketone, cyclopentanone, cyclohexanone, 2-methylcyclohexanone, and 4-methylcyclohexanone; esters such as ethyl formate, propyl formate, n-pentyl formate, methyl acetate, ethyl acetate, methyl propionate, ethyl propionate, n-pentyl acetate, and γ-butyrolactone; cellosolves such as methylcellosolve, cellosolve, butylcellosolve, and cellosolve acetate; alcohols such as methanol, ethanol, and isopropyl alcohol; water; and the like. As the additives, a surface adjuster, an antistatic agent, an anti-foulant, a water repellant, a refractive index adjuster, an adhesion improver, a curing agent, and the like may be added.

As a coating method, a coating method using a roll coater, a reverse roll coater, a gravure coater, a micro-gravure coater, a knife coater, a bar coater, a die coater, or a dip coater may be employed.

In the case where the ionizing radiation-curable material is used as the binder matrix-forming material, the low refractive index layer is formed by subjecting the coating film which is obtained by applying the coating liquid on the hard coat layer after drying as required to irradiation with ionizing radiation. In the case where the metal alkoxide is used as the binder matrix-forming material, the low refractive index layer is formed by a heating process such as drying and heating.

Examples of a method for providing the anti-static layer as the functional layer include a method of forming a film by using a metal oxide such as zinc oxide, indium oxide, and indium tin oxide by employing a vacuum film formation method. Also, it is possible to form an anti-static layer in which electroconductive metal oxide particles are dispersed in a binder matrix by applying an anti-static layer-forming coating liquid containing the electroconductive metal oxide particles such as zinc oxide, indium oxide, and indium tin oxide and a binder matrix-forming material on the hard coat layer, followed by ionizing radiation irradiation and heating as required.

Before forming the functional layer on the hard coat layer, a surface treatment such as an acid treatment, an alkali treatment, a Colona treatment, and an atmospheric pressure glow discharge plasma treatment method may be performed. By performing the surface treatment, it is possible to further improve the adhesion between the hard coat layer and the functional layer.

In the case of forming on the hard coat layer the functional layer such as the anti-reflection layer and the antistatic layer by using the metal alkoxide such as silicon alkoxide as the binder matrix-forming material, it is preferable to perform a saponifying treatment before forming the functional layer. It is possible to further improve the adhesion between the hard coat layer and the functional layer by performing an alkali treatment.

The hard coat film having the above-described structure is excellent in adhesion to the functional layer.

Example 1

A hard coat layer-forming coating liquid was prepared by mixing 80 parts by mass of an acrylic acid derivative (product of Kyoeisha Chemical Co., Ltd.; trade name: pentaerythritol triacrylate) and 5 parts by mass of a photopolymerization initiator (1-hydroxycyclohexylphenylketone; product of Chiba Specialty Chemicals Ltd.; trade name: Irgacure184) in 80 parts by mass of methylisobutylketone.

Next, a coating film was formed by applying the prepared hard coat layer-forming coating liquid at a thickness of 10 μm on a substrate made from polyethylenetelephthalate by bar coating, followed by heating in an oven at 50° C. for one minute for removing methylisobutylketone in the coating film.

Next, a monomer coating film was cured by irradiation with an ultraviolet ray generated by using an ultrahigh pressure mercury lamp to form a hard coat layer. An ultraviolet ray cumulative intensity was changed (20, 40, 100, 150, 180, 250, 310, 380 (mJ/cm$^2$)) to obtain hard coat films different in characteristics.

Next, FT-IR measurement of the hard coat layers of the hard coat films different in ultraviolet ray cumulative intensity was performed by using an infrared spectroscopic analysis device (product of Jasco Corporation; trade name: FT/IR-610) to measure absorption spectrums by the ATR method. Also, KRS-5 was used as an ATR prism. The measurement was conducted in a state where the hard coat layer was pressed against the prism in order to keep a peak value at 1,300 cm$^{-1}$, at which a peak intensity is the highest, to about 1.5. An absorption intensity ratio of C=C (1,407 cm$^{-1}$) to C=O (1,720 cm$^{-1}$) was calculated to perform comparison. The measurement was conducted for 4 times for each of the samples, and an average value was used as a measurement value of the absorption intensity ratio. The carbon double bond (C=C)/carboxylic acid group (C=O) absorption intensity ratios of the hard coat layers of the hard coat films are shown in Table 1.

Next, a pencil hardness of each of the hard coat layers different in ultraviolet ray cumulative intensity was measured in accordance with JIS K5401. A pencil scratch testing machine (product of Tester Sangyo Co., Ltd.) was used for the pencil scratch test. Results of the pencil scratch test of the hard coat coatings are shown in Table 1.

Next, an anti-reflection coating obtainable by alternately laminating TiO$_2$ and SiO$_2$ was formed on each of the hard coat layers different in ultraviolet ray cumulative intensity. Films of TiO$_2$ (45 nm), SiO$_2$ (55 nm), TiO$_2$ (105 nm), and SiO$_2$ (140 nm) were formed in this order from the hard coat layer side by sputtering.

Evaluation of adhesion between the hard coat coating and the anti-reflection coating in each of the hard coat films in which the anti-reflection layer was formed on the hard coat layer as the function layer was performed by employing a grid taping method in accordance with JIS K5400. Each of the hard coat films was fixed on a steel plate, and a surface of the anti-reflection layer which is the function layer was cut using a cutter to form a grid of 100 squares (10 squares×10 squares) on the surface. The size of each of the squares was 1 mm×1 mm. A cellophane adhesive tape was adhered to the cuts of the grid and peeled off, and a state of the adhesion between the anti-reflection layer and the hard coat layer was confirmed by using a microscope. Results of the adhesion evaluation test are shown in Table 1. The number of peeled squares is indicated as x/100 (x is the number of squares that were not peeled).

Example 2

Hard coat films having hard coat layers different in ultraviolet ray cumulative intensity were prepared in the same manner as in Example 1, and carbon double bond (C═C)/carboxylic acid group (C═O) absorption intensity ratios and pencil hardnesses of the hard coat coatings were measured. Next, in the same manner as in Example 1, an anti-reflection layer was formed on each of the hard coat layers different in ultraviolet ray cumulative intensity to perform the adhesion evaluation by the grid taping method. The acrylic acid derivative used for the hard coat layers was changed to UV1700B which is urethane acrylate produced by Nippon Synthetic Chemical Co., Ltd. Results of the measurements are shown in Table 1.

The thus-obtained measurement results are summarized in Table 1 shown below.

Example 3

The hard coat film obtained in Example 2 by forming the hard coat layer by adjusting the ultraviolet ray cumulative intensity to 180 mJ/cm$^2$ underwent an alkali treatment wherein the hard coat film was: dipped into a 1.5N—NaOH solution heated to 50° C. for 2 minutes; washed with water; neutralized by dipping into a 0.5 mass %-$H_2SO_4$ solution for 30 seconds at a room temperature; washed with water; and dried. A low refractive index layer-forming coating liquid was prepared by diluting 5 parts by weight of an oligomer obtained by hydrolysis of silicon alkoxide made from tetraethoxysilane using 1 mol/L of hydrochloric acid and 5 parts by weight of low refractive index silica particles with 190 parts by weight of isopropanol. The obtained low refractive index layer-forming coating liquid was applied on the hard coat layer after the alkali treatment in such a manner as to achieve a dried film thickness of 100 nm by using a bar coater, and the coating liquid was dried to form an anti-reflection layer. Adhesion test was performed on the obtained hard coat

TABLE 1

| | | Ultraviolet Ray Cumulative Intensity (mJ/cm$^2$) | | | | | | | |
| --- | --- | --- | --- | --- | --- | --- | --- | --- | --- |
| | | 20 | 40 | 100 | 150 | 180 | 250 | 310 | 380 |
| Example 1 (pentaerythritol-triacrylate; product of Kyoeisha Chemical Co., Ltd.) | Absorption Intensity Ratio | 0.42 | 0.41 | 0.38 | 0.29 | 0.28 | 0.25 | 0.23 | 0.21 |
| | Pencil Hardness Test | H | H | H | H | 2H | 2H | 3H | 3H |
| | Adhesion Test | 0/100 | 0/100 | 26/100 | 100/100 | 100/100 | 100/100 | 100/100 | 100/100 |
| Example 2 (UV1700B; product of Nippon Synthetic Chemical Co., Ltd.) | Absorption Intensity Ratio | 0.25 | 0.21 | 0.20 | 0.19 | 0.17 | 0.15 | 0.13 | 0.12 |
| | Pencil Hardness Test | 2H | 3H | 3H | 4H | 4H | 4H | 4H | 4H |
| | Adhesion Test | 100/100 | 100/100 | 100/100 | 100/100 | 100/100 | 100/100 | 0/100 | 0/100 |

As is apparent from the results shown in Table 1, each of the hard coat coatings having the absorption intensity ratio ranging from 0.15 to 0.30, which was detected by the ATR method, was excellent in adhesion to the anti-reflection coating. The hard coat coatings failed to achieve the absorption intensity ratio ranging from 0.15 to 0.30 was inferior in adhesion. That is to say, it was confirmed that there is correlativity between the absorption intensity ratio and the adhesion, and that the hard coat film of this invention achieves the high adhesion between the function layer and the hard coat layer.

Also, the hard coat film obtained in Example 2 by forming the hard coat layer on the substrate film by adjusting the ultraviolet ray cumulative intensity to 180 mJ/cm$^2$ and the hard coat film obtained in Example 2 by forming the anti-reflection layer on the hard coat layer were subjected to a weather resistance test wherein the hard coat films were stored at a temperature of 63° C. and a humidity of 50%. A pencil hardness of the hard coat layer after the weather resistance test of the hard coat film having the hard coat layer on the substrate film was 4 H, which was detected by the pencil hardness test. Adhesion after the weather resistance test of the hard coat film having the hard coat layer and the anti-reflection layer on the substrate film was 100/100 (all of 100 squares were not peeled), which was detected by the adhesion test.

film having the low refractive index layer on the hard coat layer. As a result of the adhesion test, the adhesion of the hard coat film in which the hard coat layer was formed by adjusting the ultraviolet ray cumulative intensity to 180 mJ/cm$^2$ was 100/100 (all of 100 squares were not peeled).

(The disclosure of Japanese Patent Application No. JP2006-147793, filed on May 29, 2006, is incorporated herein by reference in its entirety.)

What is claimed is:

1. A hard coat film comprising a hard coat layer and a function layer on a substrate film, wherein
   the hard coat layer has a thickness in the range from 3 μm to 15 μm and is formed by irradiating an acrylic acid derivative with ionizing radiation, and wherein
   (a) a carboxylic acid group (C═O) absorption intensity of a surface of the hard coat layer and (b) a carbon double bond (C═C) absorption intensity of the hard coat layer surface satisfy a numerical value range represented by the following Expression 1, the absorption intensities being measured by infrared ray spectroscopy:

$$0.15 \leq (b)/(a) \leq 0.30 \qquad \text{Expression 1.}$$

2. The hard coat film according to claim 1, wherein the function layer provided adjacent to the hard coat layer comprises a metal oxide.

3. The hard coat film according to claim 1, wherein the acrylic acid derivative is urethane acrylate.

4. A display comprising the hard coat film of claim 1 on a surface thereof.

5. A hard coat film comprising a hard coat layer and a function layer on a substrate film, wherein
the hard coat layer has a thickness in the range from 3 μm to 15 μm and comprises a cured matter of an acrylic acid derivative, and wherein
(a) a carboxylic acid group (C=O) absorption intensity of a surface of the hard coat layer and (b) a carbon double bond (C=C) absorption intensity of the hard coat layer surface satisfy a numerical value range represented by the following Expression 1, the absorption intensities being measured by infrared ray spectroscopy:

$$0.15 \leq (b)/(a) \leq 0.30 \quad \text{Expression 1.}$$

6. The hard coat film according to claim 1, wherein the ionizing radiation is ultraviolet ray.

7. The hard coat film according to claim 1, wherein the function layer has a thickness in the range from 0.01 μm to 1 μm.

8. The hard coat film according to claim 1, wherein the function layer is an anti-reflection layer.

9. A polarization plate comprising:
the hard coat film according to claim 1;
a polarization layer;
a second substrate film, wherein
the polarization layer and the second substrate film are arranged in order on the opposite side of the substrate film of the hard coat film from the side on which the hard coat layer and the function layer is arranged.

* * * * *